United States Patent [19]

Logemann

[11] 4,265,139
[45] May 5, 1981

[54] TILT STEERING WHEEL AND SUPPORT COLUMN APPARATUS

[75] Inventor: Larry R. Logemann, Decatur, Ill.

[73] Assignee: Caterpillar Tractor Co., Peoria, Ill.

[21] Appl. No.: 89,114

[22] PCT Filed: May 14, 1979

[86] PCT No.: PCT/US 79/00319

§ 371 Date: May 14, 1981

§ 102(e) Date: May 14, 1981

[51] Int. Cl.³ .............................................. B62D 1/18
[52] U.S. Cl. ...................................... 74/485; 74/493; 74/527
[58] Field of Search ........................ 74/485, 493, 527

[56] References Cited

U.S. PATENT DOCUMENTS

| | | | |
|---|---|---|---|
| 994,428 | 6/1911 | Schmidt | 74/485 |
| 2,223,565 | 12/1940 | Illmer | 74/485 |
| 2,586,111 | 2/1952 | Maurice et al. | 74/485 X |
| 2,830,464 | 4/1958 | Winterbauer | 74/493 |
| 3,167,971 | 2/1965 | Ziegler | 74/493 |
| 3,199,625 | 8/1965 | Liebreich | 74/493 |
| 3,279,277 | 10/1966 | Stevens et al. | 74/493 |
| 3,395,930 | 8/1968 | Morgan | 280/87 |
| 3,555,924 | 1/1971 | Scheffler, Jr. | 74/493 |
| 3,628,396 | 12/1971 | Grobowski | 74/493 |
| 3,737,003 | 6/1973 | Beals et al. | 74/493 X |
| 3,799,569 | 3/1974 | Baker | 74/493 X |
| 3,807,252 | 4/1974 | Parr | 74/493 |
| 4,033,158 | 7/1977 | Chamberlain | 74/493 X |

*Primary Examiner*—Allan D. Herrmann
*Attorney, Agent, or Firm*—Charles E. Lanchantin, Jr.

[57] ABSTRACT

An apparatus (10) includes an upwardly inclined stationary support column (12) and an upwardly inclined steering wheel column (14) pivotally mounted thereon. An interlock mechanism (86) is provided at the distal end (52) of the support column (12) for locking the columns (12, 14) together at one angular position including that of substantially parallel alignment of the columns (12, 14). A vehicle control member (60) can be mounted at the distal end (52) of the support column (12) subjacent the steering wheel (16), and the support column (12) can include a pair of posts (30, 32) defining a U-shaped slot (50) for receiving the steering wheel column (14).

11 Claims, 3 Drawing Figures

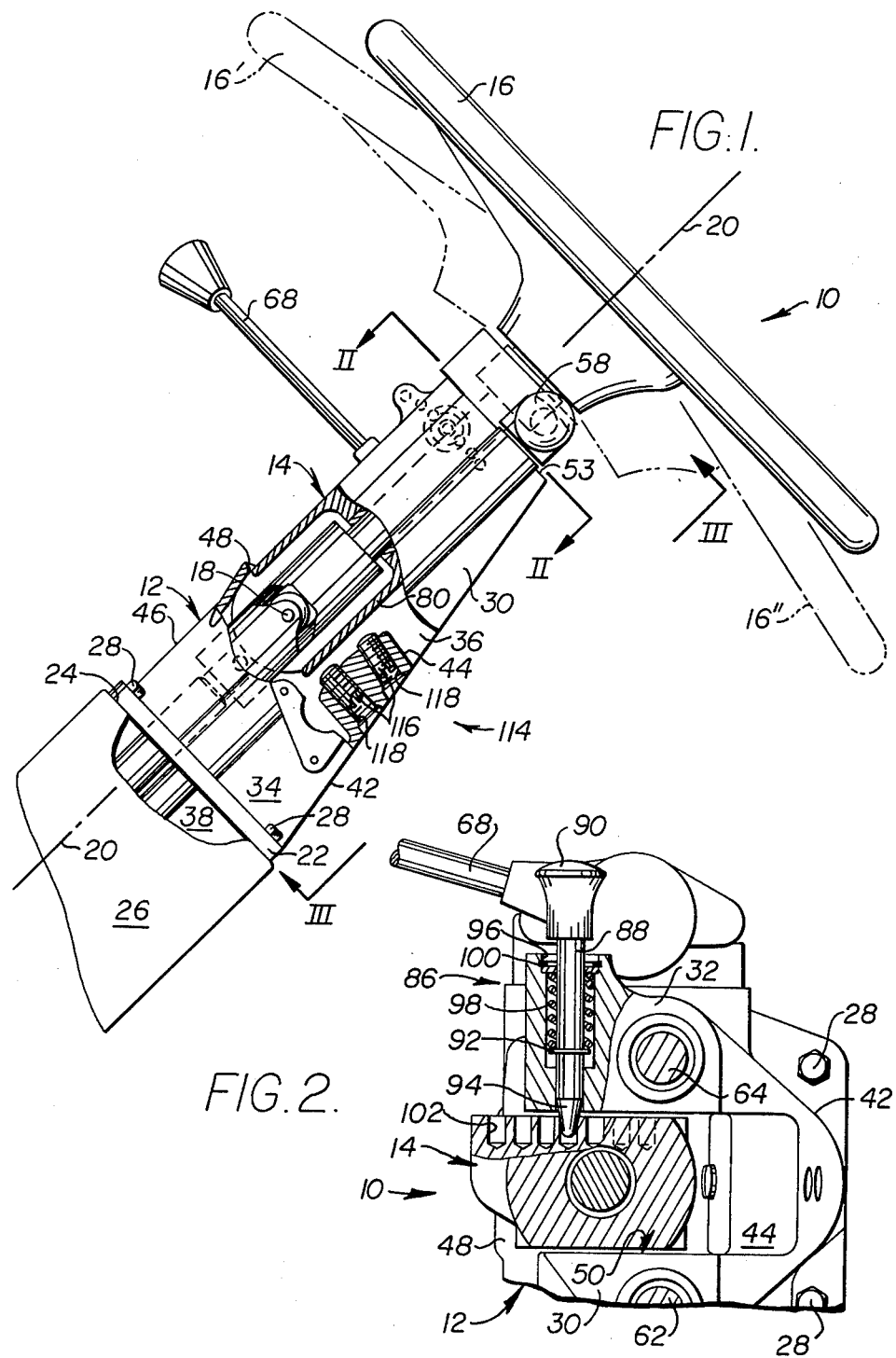

TILT STEERING WHEEL AND SUPPORT COLUMN APPARATUS

DESCRIPTION

1. Technical Field

The present invention relates to a tilt steering wheel and support column apparatus, and particularly to conveniently establishing a preselected tilt angle between a support column and a steering wheel column and positive accessibility to one or more control members located on the upper part of the support column.

2. Background Art

In order to gain easier access to the driver's seat and to accommodate wide dissimilarities in stature, it is becoming more conventional to incorporate tiltable steering columns in vehicles. Many of these adjustable steering columns are complex and costly in construction, or have an interlock that is inconvenient to maniplate during manual readjustment of the angle of the steering wheel.

Another problem that is associated with large earthmoving vehicles, trucks and the like is that a plurality of auxiliary control levers must be positioned near the steering wheel. For example, there is frequently a need to mount an emergency brake control lever or a separate retarder control lever in an accessible position on the steering column. But with a tiltable steering wheel it is difficult to directly mechanically connect the auxiliary levers to the remotely disposed control mechanisms. Moreover, it is desirable to mount such important auxiliary levers in fixed and secure positions so that the vehicle operator can conveniently and instantaneously manipulate the lever with great reliability.

Accordingly, what is desired is a steering wheel column that is easily adjustable in angularity on a support column and wherein the support column provides a rugged construction so that the plurality of separate controls supported thereby can be conveniently operated in a positive manner.

DISCLOSURE OF INVENTION

In accordance with one aspect of the present invention a tilt steering wheel and support column apparatus includes an upwardly inclined stationary support column having a distal end, and upwardly inclined steering wheel column having a steering wheel pivotally mounted on the support column, an interlock mechanism for selectively locking the two columns together at one of a plurality of angular positions, and with the interlock mechanism being located at the distal end of the support column subjacent the steering wheel.

In another aspect of the present invention a stationary support column having a distal end pivotally supports a steering wheel column at a preselected tilt angle therebetween. Advantageously, a vehicle control lever is mounted for pivotal movement at the distal end of the support column subjacent the steering wheel.

In still another aspect of the present invention a steering wheel column having a steering wheel is pivotally mounted in an upwardly inclined stationary support column and a preselected tilt angle is established therebetween. Advantageously, the support column defines a longitudinally oriented and upwardly facing U-shaped slot partly enclosing and protecting the adjustable steering column.

BRIEF DESCRIPTION OF DRAWINGS

FIG. 1 is a diagrammatic, side elevational view of the tilt steering wheel and support column apparatus of the present invention with portions broken open and shown in section to better illustrate details thereof, and with a portion of the apparatus deleted for clarity.

FIG. 2 is an enlarged, diagrammatic and partially sectionalized view of the apparatus of the present invention as taken along line II—II of FIG. 1.

BEST MODE FOR CARRYING OUT THE INVENTION

Figure 3:
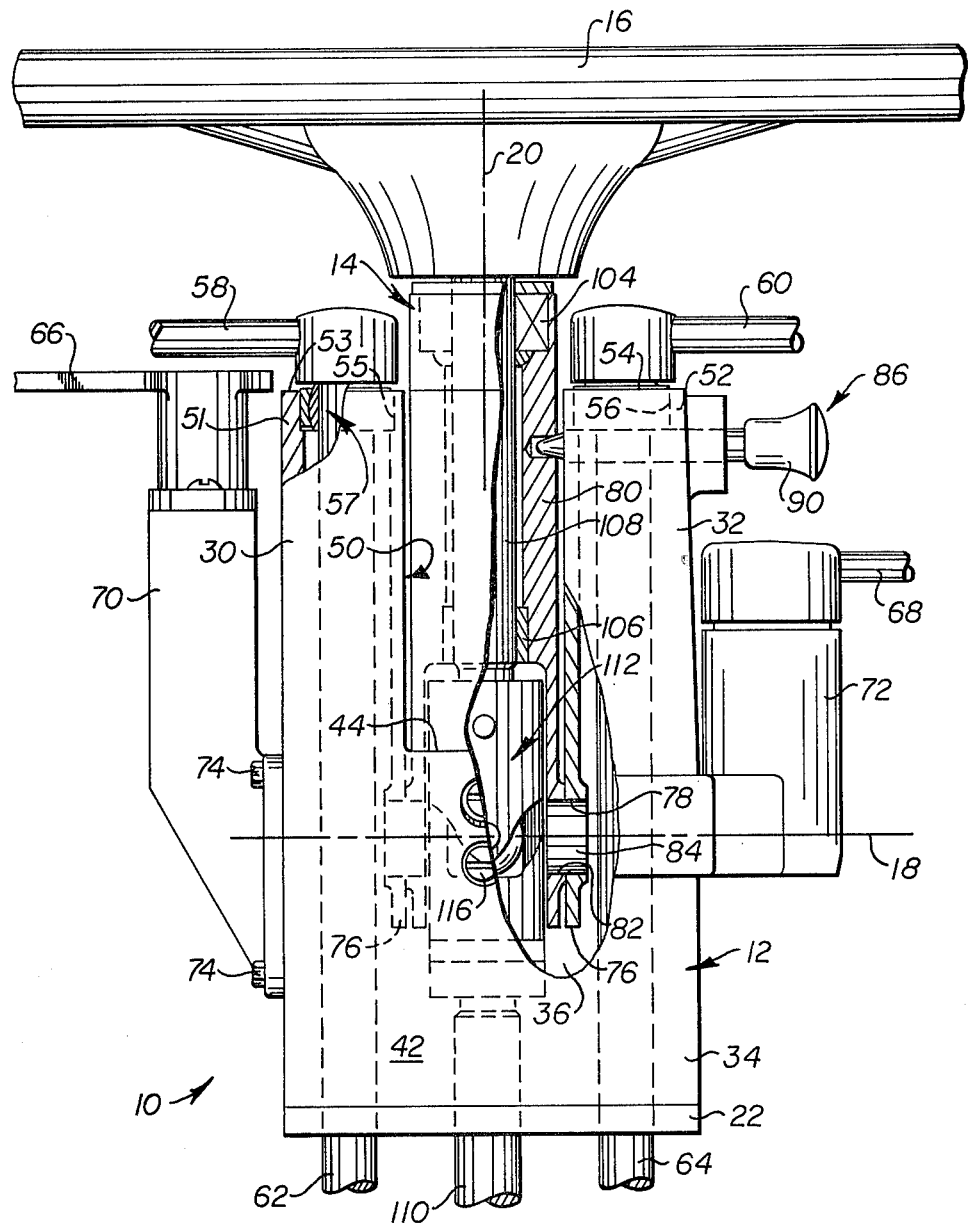
FIG. 3 is a slightly enlarged diagrammatic, and rear elevational view of the apparatus of the present invention as taken along line III—III of FIG. 1, or in a direction looking forwardly and upwardly at an angle normal to the middle axis of the adjustable steering column.

In the embodiment of the invention illustrated in FIGS. 1-3, a tilt steering wheel and support column apparatus 10 is shown to include an upwardly inclined stationary support column 12 and a pivotally adjustable an upwardly inclined steering wheel column 14. A steering wheel 16 is located at the top end of the steering wheel column, and as can be visualized best with reference to FIG. 1 the steering wheel and steering wheel column can be selectively adjusted to any one of seven tilt angle positions individually disposed about 4° apart. Thus, in general, the steering wheel column can be pivoted about a transverse pivot axis 18 about 12° in either direction from the centered position illustrated along a central axis 20 as shown by phantom steering wheels 16' and 16".

The stationary support column 12 has a mounting flange 22 which is releasably secured to an angularly inclined mounting surface 24 of a fixed mounting base 26, as by a plurality of conventional fasteners 28. In the instant example the support column has a pair of upstanding hollow posts 30, 32 integrally connected to a lower hollow body portion 34. The posts and body portion define a hollow internal chamber 36 that opens downwardly into open communication with a chamber 38 in the mounting base 26.

The hollow body portion 34 of the support column 12 has a rear wall 42 having an upper edge 44 located between the lower part of the posts 30, 32 as shown in FIGS. 1 and 3, and a front wall 46 having an upper edge 48 located between the lower part of the posts as shown in FIG. 1. Thus, the posts and body portion define a longitudinally oriented and upwardly opening U-shaped slot 50 for receiving the steering wheel column 14 and with the posts and body portion partly enclosing and protecting the steering wheel column.

As shown best in FIG. 3, the left and right posts 30,32 respectively have distal or top ends 51,52, upwardly facing distal end surfaces 53,54, and stepped openings 55 and 56 opening upwardly and outwardly upon the end surfaces. The stepped openings are of a construction sufficient for mounting a conventional bearing 57 thereat as representatively shown at the upper left portion of the drawing. In this manner two relatively rugged upstanding supports are provided for an emergency brake control member 58 and a retarder control member 60 at the opposite sides of the steering wheel column 14. In the instant example the emergency brake control member 58 is a lever secured at a right angle to a control shaft 62 mounted within the left bearing 57 and depending within the chamber 36 of the left post substantially parallel to the central axis 20. Likewise, the retarder control member 60 is a lever similarly secured to a control shaft 64 depending through the chamber 36 of the right post in parallel relation. In addition to the control members 58 and 60, a turn signal control member 66 and a trailer brake control member 68 are mounted on the top ends of outstanding housings 70 and 72 respectively releasably connected to the left and right sides of the support column 12. The turn signal control member 66 and its supporting housing 70 have been deleted from FIG. 1 so that other details of the apparatus 10 can be better appreciated. The supporting housing 70 is releasable from the body portion 34 upon removal of a plurality of fasteners 74, although it can be integral therewith.

As shown in FIG. 3 the lower, inside portions of the left and right posts 30,32 define a pair of laterally spaced walls 76. Each wall has a cylindrical opening 78 therein concentrically arranged along the transverse pivot axis 18. The steering wheel column 14 includes a tubular body 80 having a similar pair of laterally spaced cylindrical openings 82 arranged along the pivot axis, and a pair of axially aligned pivot pins 84 are nonrotatably secured in the openings 82. The pins are pivotally received in the openings 78 so that the steering wheel column 14 can be selectively tilted about the pivot axis 18 protectedly within the support column 12.

Referring now to FIG. 2, a transversely oriented interlock mechanism 86 is shown as having a resiliently biased locking pin or plunger 88 defining an outer control handle 90, a central shoulder or annular flange 92, and an inner end point 94. The locking pin is received within stepped recessed 96 defined in the top end 52 of the right post 32, and a coiled compression spring 98 is disposed encirclingly about the locking pin between the shoulder 92 and a washer assembly 100 releasably connected to the post within the recess. A plurality of equally spaced apart blind bores or apertures 102 are defined in the tubular body 80 for selective alignment with the recess as the steering wheel column 14 is tilted about the transverse pivot axis 18.

The tubular body 80 has stepped recesses for receiving conventional bearings 104 and 106 as shown best in FIG. 3. The steering wheel 16 is suitably connected to a depending steering wheel shaft 108 rotatably mounted within these bearings. The steering wheel shaft 108 is connected to an output shaft 110 through a conventional U-joint 112 disposed for aligned articulated movement about the transverse pivot axis 18. As in prior systems, the output shaft is connected to a suitable steering valve, not shown, for steering of the vehicle.

Referring to FIG. 1, adjustable stop means 114 are provided to limit the maximum angle of inclination of the steering wheel column 14 on the support column 12. The stop means includes a pair of threaded members 116 in corresponding threaded bores 118 extending through the rear wall 42 into the chamber 36. In use, the threaded members are screw threadably adjusted as by a screwdriver or the like to contact the rear portion of the tubular member 80 respectively at the forward and rearward maximum positions of inclination of the steering wheel column.

INDUSTRIAL APPLICABILITY

The tilt steering wheel and support column apparatus 10 can be installed on a conventional vehicle such as truck or the like. In use the vehicle operator can conveniently grasp the handle 90 of the interlock mechanism 86 and pull it transversely outwardly to the right from within the recess 96 because it is located closely underneath or subjacent the steering wheel 16. In this way the point 94 is withdrawn from one of the apertures 102 so that the operator can urge the steering wheel column 14 forwardly or rearwardly to better accommodate his physical stature. In the central position of the steering wheel column illustrated in FIG. 1 the steering wheel column and support column 12 are substantially aligned in parallel; specifically, the tubular body 80 is oriented along the upwardly inclined central axis 20 and the individual posts 30,32 are substantially parallel thereto in positions giving maximum protection to the steering wheel column. Since stop means 114 are provided, the maximum forward or rearward positions of the steering wheel column on the support column are relatively easy to obtain. Upon reaching such locations the control handle 90 can be released so that the previously compressed spring 98 can urge the end point 94 into the corresponding end aperture 102. This feature is particularly useful when the operator leaves the vehicle.

Advantageously, the vehicle operating levers 58, 60,66 and 68 remain in position closely underneath or subjacent the steering wheel 16 regardless of the angle of inclination of the steering wheel column 14. Consequently they are immediately and conveniently available to the operator since they remain in fixed and secured positions on the support column 12. The upstanding hollow posts 30,32 provide a mount for the levers and a convenient way to route associated depending control shafts 62,64 therethrough without the need for complicated intermediate control linkages, U-joints or the like.

Other aspects, objects and advantages of this invention can be obtained from a study of the drawings, the disclosure and the appended claims.

I claim:

1. A tilt steering wheel and support column apparatus (10) comprising:
    an upwardly inclined stationary support column (12) having an upwardly facing distal end surface (54);
    an upwardly inclined steering wheel column (14) having a steering wheel (16);
    means (84,86) for pivotally mounting the steering wheel column (14) on the support column (12) and adjusting the tilt angle therebetween; and
    a vehicle control member (60) mounted for pivotal movement on the support column (12) at the distal end surface (54) subjacent the steering wheel (16).

2. The apparatus (10) of claim 1 wherein the control member (60) is a vehicle braking control lever.

3. The apparatus (10) of claim 1 wherein said support column (12) has an internal chamber (36) and an opening (56) extending from the end surface (54) into the chamber (36), and including a control shaft (64) connected to the control member (60) and extending downwardly through the opening (56) into the chamber (36).

4. The apparatus (10) of claim 1 wherein the steering wheel column (14) defines a plurality of apertures (102) and said means (84,86) includes a resiliently biased plunger (88) transversely mounted on the support column (12) and selectively engageable with one of the apertures (102) in the steering wheel column (14).

5. The apparatus (10) of claim 1 wherein the support column (12) includes first and second posts (32,30) located at each side of the steering wheel column (14).

6. The apparatus (10) of claim 5 wherein the support column (12) includes a lower body portion (34) integrally connecting the first and second posts (30,32) and partly enclosing the steering wheel column (14).

7. The apparatus (10) of claim 6 wherein said body portion (34) and first and second posts (30,32) define a longitudinally oriented, upwardly facing U-shaped slot (50).

8. The apparatus (10) of claim 5 wherein the first post (32) defines the first distal end surface (54), the second post (30) defines a second distal end surface (53), and including a second control member (58) mounted for pivotal movement on the second post (30) at the second distal end surfce subjacent the steering wheel (16).

9. A tilt steering wheel and support column apparatus (10) comprising:
  an upwardly inclined steering wheel column (14) having a steering wheel (16); and
  upwardly inclined stationary support column means (12,84,86) for pivotally supporting the steering wheel column (14) and establishing a preselected tilt angle therebetween, the support column means (12,84,86) including first and second hollow posts (32,30) individually located at each side of the steering wheel column (14) and a lower hollow body portion (34) integrally connected to the posts (30,32) and defining a longitudinally oriented and upwardly opening U-shaped slot (50) of a construction sufficient for receiving the steering wheel column (14) protectingly within.

10. A tilt steering wheel and support column apparatus (10) comprising:
  an upwardly inclined steering wheel column (14) having a steering wheel (16);
  upwardly inclined stationary support column means (12,84,86) for pivotally supporting the steering wheel column (14) and establishing a preselected tilt angle therebetween, the support column means (12,84,86) including first and second posts (32,30) located at each side of the steering wheel column (14) defining a longitudinally oriented and upwardly opening U-shaped slot (50) of a construction sufficient for receiving the steering wheel column (14) protectingly within;
  first and second control levers (60,58); and
  first and second control shafts (64,62) connected to the respective levers (60,58), the first control lever (64) mounted on the first post (32) with the first control shaft (64) depending therewithin, and the second control lever (58) mounted on the second post (30) with the second control shaft (62) depending therewithin.

11. A tilt steering wheel and support column apparatus (10) comprising:
  an upwardly inclined steering wheel column (14) having a steering wheel (16);
  upwardly inclined stationary support column means (12,84,86) for pivotally supporting the steering wheel column (14) and establishing a preselected tilt angle therebetween, the support column means (12,84,86) defining a longitudinally oriented and upwardly opening U-shaped slot (50) of a construction sufficient for receiving the steering wheel column (14) protectingly within;
  a vehicle braking control lever (60); and
  a control shaft (64) connected to the control lever (60), the control lever (60) being pivotally mounted on the support column means (12,84,86) and the control shaft (64) depending within the support column means (12,84,86).

* * * * *